United States Patent
Paczkowski et al.

(10) Patent No.: US 8,311,521 B1
(45) Date of Patent: Nov. 13, 2012

(54) MANAGING NOTIFICATIONS ON BEHALF OF A MOBILE DEVICE

(75) Inventors: Lyle W. Paczkowski, Mission Hills, KS (US); Farni B. Weaver, Spring Hill, KS (US); Nicolas A. Nehme Antoun, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 443 days.

(21) Appl. No.: 12/703,616

(22) Filed: Feb. 10, 2010

Related U.S. Application Data

(60) Provisional application No. 61/263,193, filed on Nov. 20, 2009.

(51) Int. Cl.
*H04M 3/42* (2006.01)

(52) U.S. Cl. .............. 455/414.1; 348/14.06; 455/412.2; 455/412.1; 358/1.15

(58) Field of Classification Search .............. 455/512, 455/412.2, 433, 413; 340/539.11, 539.1; 380/278; 709/207, 225; 714/38.13
See application file for complete search history.

(56) References Cited

U.S. PATENT DOCUMENTS

| | | | | |
|---|---|---|---|---|
| 7,466,334 | B1 * | 12/2008 | Baba | 348/14.06 |
| 2004/0048627 | A1 * | 3/2004 | Olvera-Hernandez | 455/466 |
| 2008/0270560 | A1 * | 10/2008 | Tysowski et al. | 709/207 |
| 2008/0316531 | A1 * | 12/2008 | Suzuki et al. | 358/1.15 |
| 2009/0036102 | A1 * | 2/2009 | Ho | 455/412.2 |
| 2009/0158136 | A1 * | 6/2009 | Rossano et al. | 715/232 |
| 2010/0048178 | A1 * | 2/2010 | Song et al. | 455/412.1 |
| 2011/0247638 | A1 * | 10/2011 | Ayala | 131/270 |

\* cited by examiner

*Primary Examiner* — Jean Gelin
*Assistant Examiner* — Mahendra Patel

(57) ABSTRACT

Methods are disclosed for managing notifications sent from various applications accessible by a mobile device. Notifications, representing an occurrence of an event, are received at a notification manager from applications. It is determined that the mobile device is registered with the network. A first set of applications to which the mobile device is currently subscribed and a first set of notifications from the applications are identified. A notification message that includes the first set of notifications is communicated to the mobile device.

16 Claims, 11 Drawing Sheets

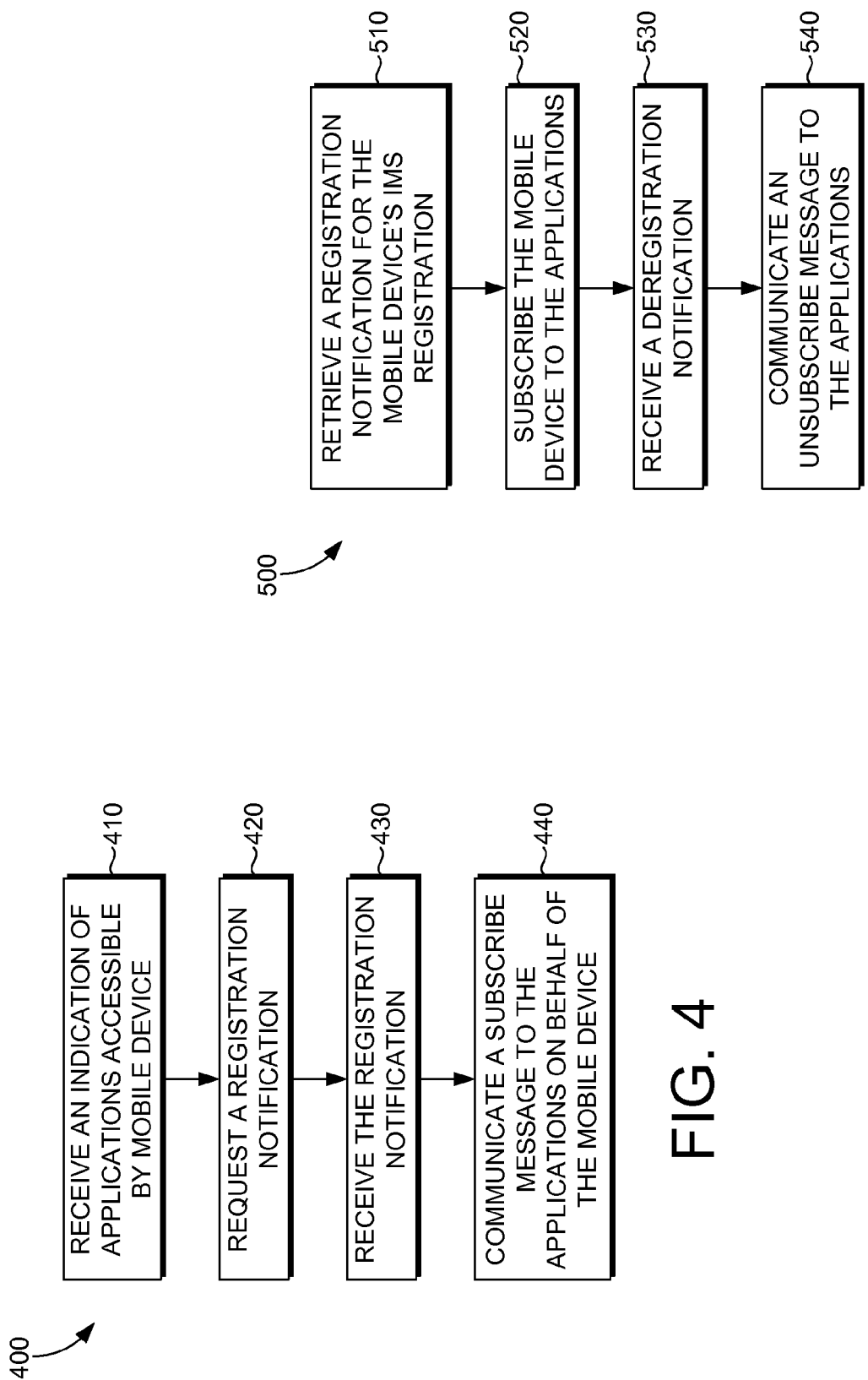

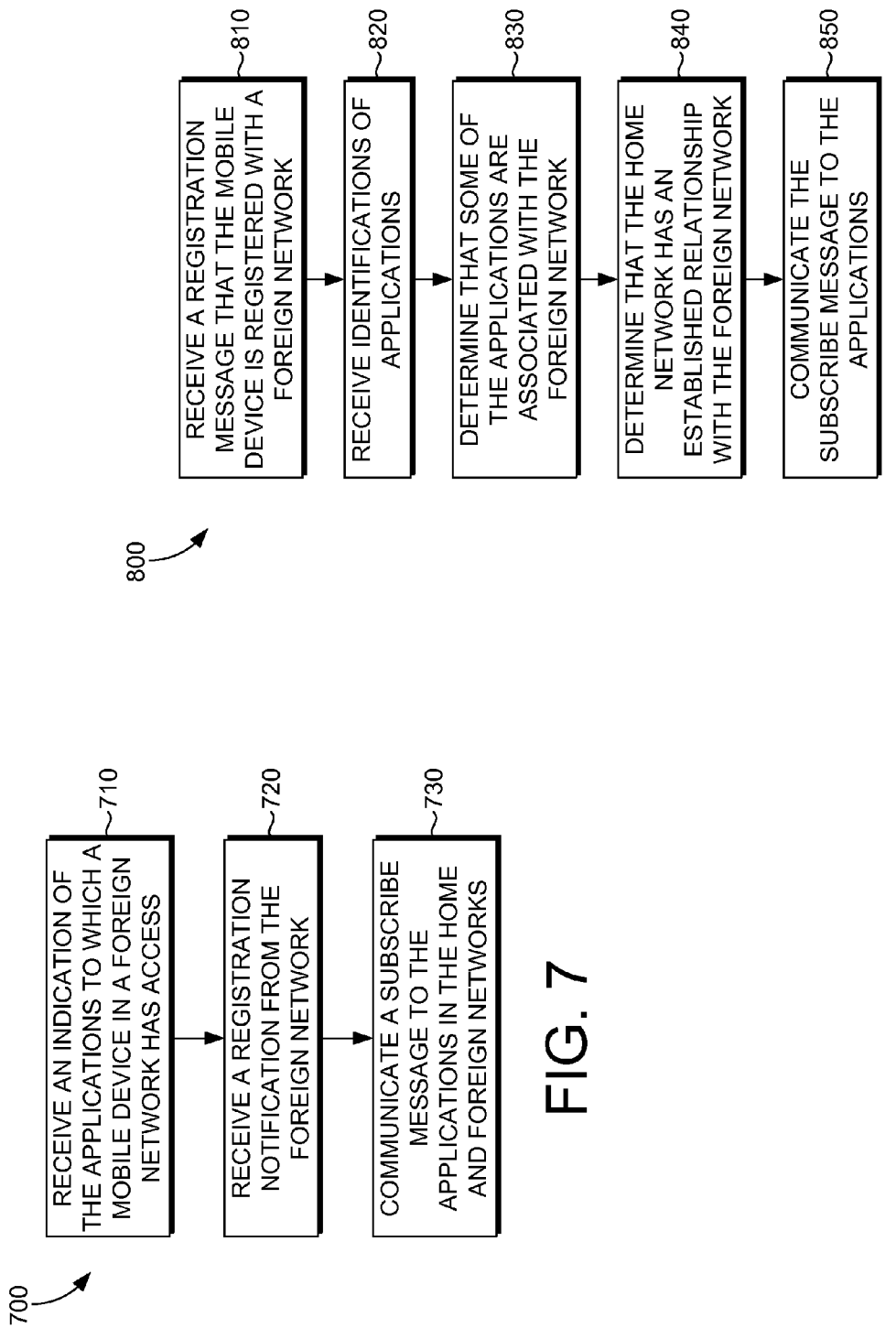

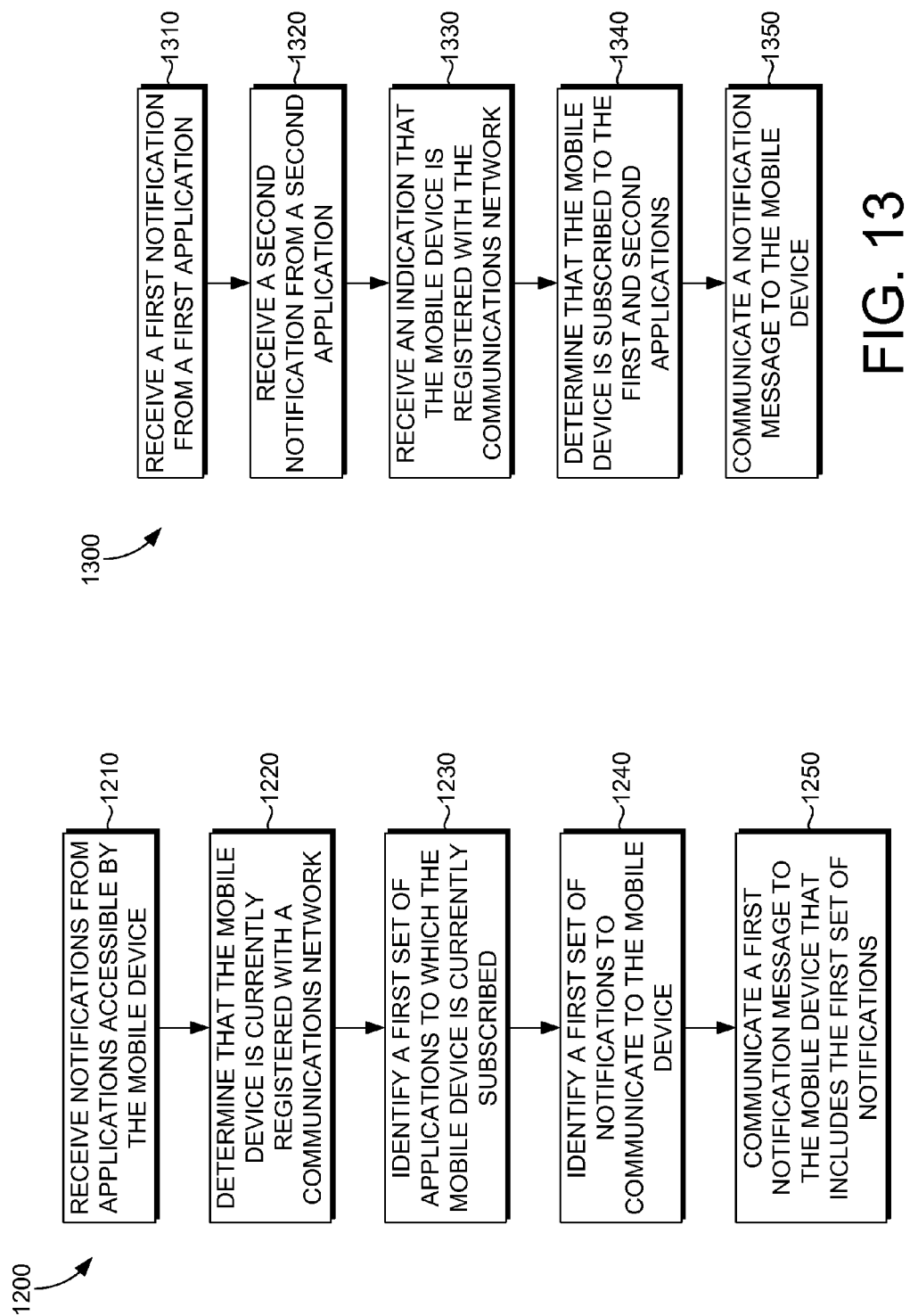

MANAGING NOTIFICATIONS ON BEHALF OF A MOBILE DEVICE

CROSS REFERENCE TO RELATED APPLICATIONS

This application claims the benefit of, and expressly incorporates by reference, U.S. Provisional Application No. 61/263,193, filed on Nov. 20, 2009.

This application is also related by subject matter to two other applications, which are incorporated by reference herein. All three applications are as follows (one of which being this application): 1) "MANAGING SUBSCRIPTION MESSAGES ON BEHALF OF A MOBILE DEVICE"; 2) "MANAGING SUBSCRIPTION MESSAGES FOR AN OUT-OF-NETWORK MOBILE DEVICE"; and 3) "MANAGING NOTIFICATIONS ON BEHALF OF A MOBILE DEVICE".

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media for managing notifications sent by applications to a mobile device. While typically these notifications are sent directly to the mobile device, a notification manager may be used to consolidate the notifications and send multiple notifications to a mobile device at the same time in the form of a single notification message. The timing of the communication of the notification messages to the mobile device may be based on, for example, a predetermined interval of time between notification messages, the number of notification messages received, the current amount of traffic on the network, or the type of application sending the notification. The notification manager may also be used to manage notifications for a mobile device associated with a foreign network, or for managing notifications sent from applications associated with a foreign network.

BRIEF DESCRIPTION OF THE SEVERAL VIEWS OF THE DRAWINGS

Illustrative embodiments of the present invention are described in detail below with reference to the attached drawing figures, wherein:

FIGS. 4-5 depict illustrative flowcharts of methods for managing subscription messages that are communicated to various applications that are accessible by a mobile device, in accordance with various embodiments of the present invention;

FIGS. 7-9 depict illustrative flowcharts of methods for managing subscription messages for a foreign network, the subscription messages being communicated to various applications that are accessible by a mobile device, in accordance with various embodiments of the present invention;

FIGS. 12-14 depict illustrative flowcharts of methods for managing notification messages that are communicated from various applications and that are intended for a mobile device, in accordance with various embodiments of the present invention.

DETAILED DESCRIPTION

Figure 1:
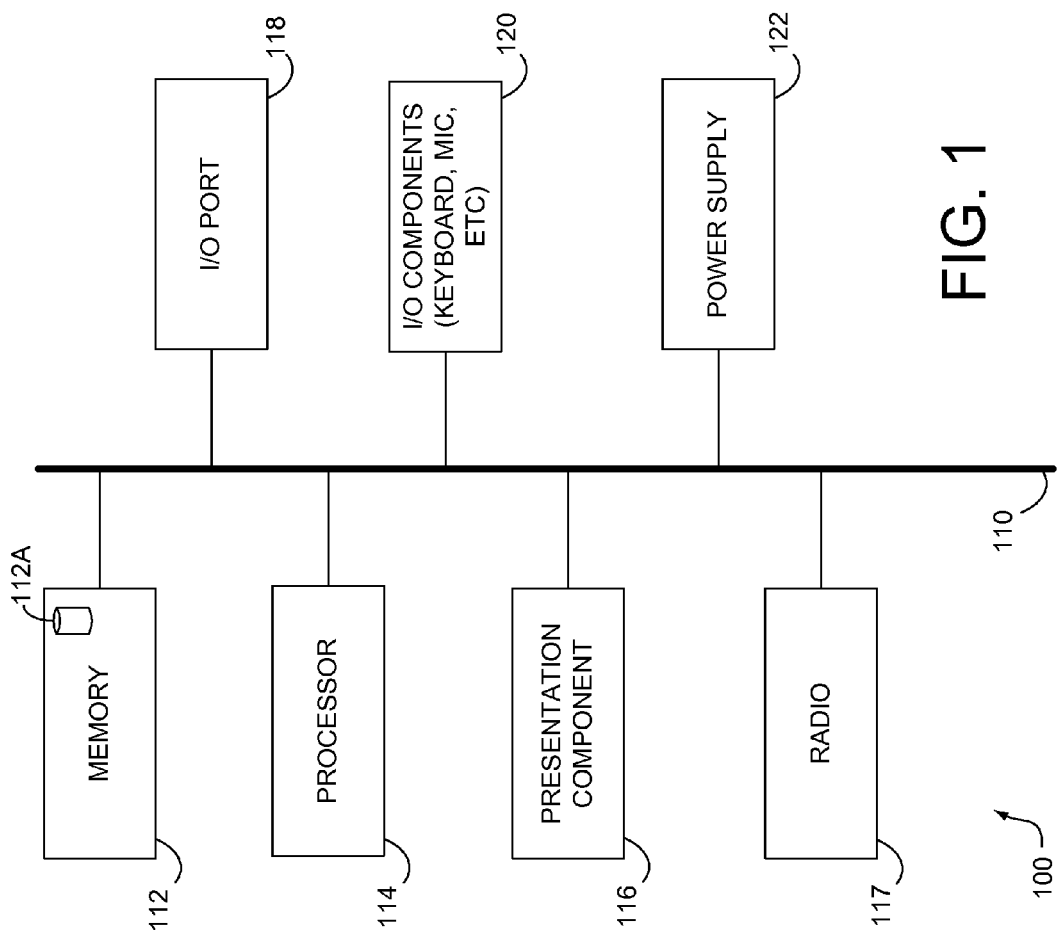
FIG. 1 depicts an illustrative device suitable for use in connection with an embodiment of the present invention.

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AC | Authentication Center |
| BGCF | Breakout Gateway Control Function |
| CDMA | Code Division Multiple Access |
| CSCF | Call Session Control Function |
| GPRS | General Packet Radio Service |
| GPS | Global Positioning System |
| GRE | Generic Routing Encapsulation |
| GSM | Global System for Mobile communications (Groupe Spécial Mobile) |
| HLR | Home Location Register |
| HSS | Home Subscriber Server |
| IMEI | International Mobile Equipment Identity |
| IMS | Internet Protocol Multimedia Subsystem |
| IMSI | International Mobile Subscriber Identity |
| IP | Internet Protocol |
| LED | Light Emitting Diode |
| MRF | Media Resource Function |
| MSISDN | Mobile Subscriber ISDN Number |
| NNI | Network-to-Network Interface |
| PDA | Personal Data Assistant |
| PSTN | Public Switched Telephone Network |
| SBC | Session Border Controller |
| SIP | Session Initiation Protocol |
| TDMA | Time Division Multiple Access |
| TMSI | Temporary Mobile Subscriber Identity |

-continued

| UMTS | Universal Mobile Telecommunications System |
| VPN | Virtual Private Network |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. A mobile device may be one of many devices, including, but not limited to, a mobile phone, a laptop, a PDA, a handheld device, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 is a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
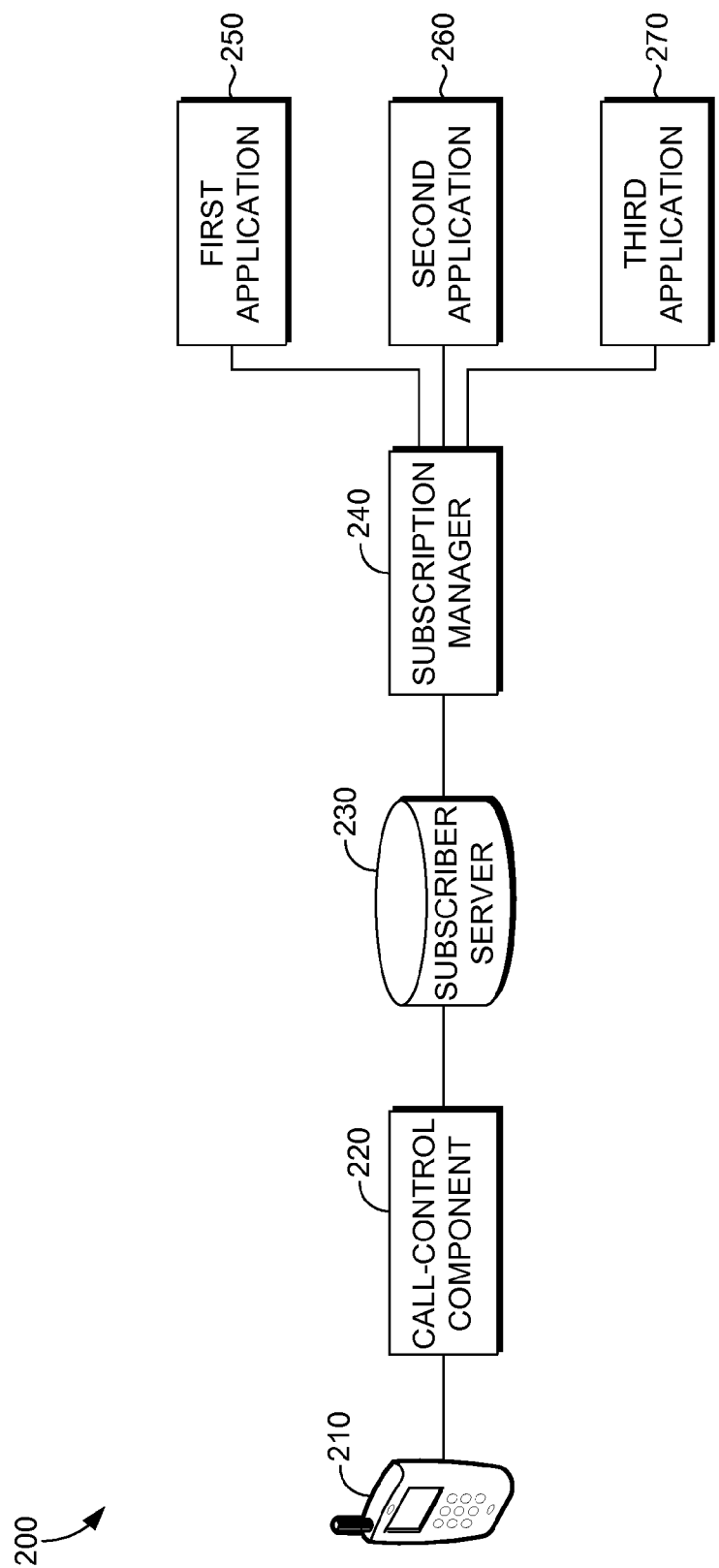
FIG. 2 depicts an illustrative operating environment suitable for practicing an embodiment of the present invention.

Turning now to FIG. 2, an illustrative operating environment is provided and referenced generally by the numeral 200, which depicts an illustrative networking environment that enables a subscription manager to send subscribe and unsubscribe messages to various applications on behalf of a mobile node (e.g., a mobile device). Initially, FIG. 2 illustrates a mobile device 210. Mobile device 210 is the type of device described in connection with FIG. 1, in one embodiment, and may include a client application that helps carry out aspects of the technology described herein. Whenever we speak of an application, software, or the like, we are really referring to one or more computer-readable media that is embodied with a set of computer-executable instructions that facilitate various actions to be performed. We will not always include this lengthy terminology because doing so would make this document more difficult to read.

A call-control component 220 generally manages the registrations of mobile devices with the communications network (e.g., IMS network), and knows how to route calls placed by a mobile device. The mobile device sends a registration request to the call-control component 220, which in turn downloads the user-service profile associated with the mobile device from a subscriber server 230. The subscriber server 230 is generally a database where subscribers are provisioned and stores the user-service profiles that indicate which services or applications the mobile device can access. The subscriber server 230 also handles calls, as it contains subscription-related information in the form of the user-service profiles, and also performs authentication and authorization of the mobile device to the network. Additionally, the subscriber server 230 contains other information associated with the mobile device, including its physical location and IP information, such as the IP address corresponding to the mobile device.

A subscription manager 240 manages the subscription of the mobile device to various applications to which the mobile device 210 has access. In one embodiment, the applications are located within a single service provider's network, but in another embodiment, one or more applications are located in a different service provider's network. While traditionally the mobile device sends subscribe and unsubscribe messages to the applications at a time interval dependent upon an expiration timer contained in each message, here, the subscription manager 240 is responsible for sending these messages to the applications on behalf of the mobile device. This drastically cuts down on the number of messages and information passing through the network, thus reducing traffic from the carrier interfaces. The subscription manager 240, in one embodiment, is aware of the applications to which the mobile device has access. In one instance, this information is communicated to the subscription manager 240 by way of a provisioning feed sent by an upstream source.

A provisioning feed is sent to the subscription manager 240 and the applications including various types of information. For example, a provisioning feed sent to the subscription manager 240 may include an indication of those applications to which the mobile device 210 can access, or in another embodiment, it may include an indication of those applications the mobile device is attempting to access so that the subscription manager 240 knows the applications to which to send a subscribe message once the device has registered with the network. The subscription manager 240 manages the subscription of the mobile device 210 to the applications, including a first application 250, a second application 260, and a third application 270. While three applications are shown in FIG. 2, it is contemplated that any number of applications may be accessible to a mobile device. Three applications are shown as only one exemplary embodiment of the invention.

The subscription manager 240 may communicate a subscription (e.g., a one-time subscription) to the subscriber server 230 to subscribe to a registration event corresponding to a mobile device or multiple mobile devices. The registration event indicates to the subscription manager 240 whether the mobile device 210 has become registered with or unregistered from the communications network. In one embodiment, the mobile device registers with the network per standard RFC3265. In one instance, once the subscription manager 240 subscribes for the mobile device's 210 registration event, such as communicating a message to the subscriber server 230 indicating that it wants to know when the mobile device 210 is registered and when it becomes unregistered to the communications network, the subscriber server 230 will respond to the subscription manager 240 by communicating a message to the subscription manager 240 with either a register or a deregister event. These events indicate the mobile device's 210 current registry status. Once the subscription manager 240 knows that the mobile device 210 is registered, it may proceed to send subscribe messages to one or more of the applications that can be accessed by the mobile device. Some of these applications require a paid subscription, such as if the user of the mobile device must pay a monthly fee to gain access to the application. Similarly, the subscriber server 230 may send a deregister notification to the subscription manager 240 when the mobile device has deregistered from the network. The subscription manager 240 may then send out unsubscribe messages to the one or more applications to which the mobile device is currently subscribed, including a first application 250, a second application 260, and a third application 270.

In one embodiment, the subscription manager 240, once it has received notification that the mobile device 210 is registered with the network, accesses an internal database to determine a subscription status of the applications that are accessible to the mobile device. For instance, one or more applications may have a subscribed status, and one or more applications may have an unsubscribed status. In other instances, none of the applications may have a subscribed status, or none of the applications may have an unsubscribed status. Which applications the subscription manager 240 sends a subscribe or unsubscribe message to may be dependent upon the status of each application.

The subscriber server 230 may send updates to the subscription manager 240 after it sends the initial register event. For instance, if the IP address or location information (e.g., physical location) associated with the mobile device has changed since the register notification was sent, the subscriber server 230 may send an update to the subscription manager 240 so that the subscription manager 240 can update the applications. Some applications (e.g., location-based services) send notifications that are dependent upon the location of the mobile device, such as a current zip code in which the mobile device is located. This may include weather or global positioning system (GPS) applications. As such, the subscription manager 240 may need to be updated with this and other types of information. In one instance, an update message is sent, but in another embodiment, a deregister event or deregistration notification is sent to the subscription manager 240, followed by a registration notification that includes the updated information.

Further, in one embodiment, the subscription manager 240 may not send a subscribe message to every application that is accessible by the mobile device once it receives notification that the mobile device is registered with the network. For instance, the subscription manager 240 may have the intelligence to determine which applications the mobile device needs to be subscribed to at that time. Some applications may be ranked as more important than others. For example, applications such as voicemail may always be subscribed to when the mobile device is registered, as the user of the mobile device will want to receive a notification indicating that a voicemail has been left (e.g., message waiting indicator (MWI)). Subscribing to a voicemail application, for instance, tells the voicemail application that the mobile device is ready to be notified when an event, such as a voicemail, occurs.

In one embodiment, the networking environment of FIG. 2 is an Internet protocol (IP) multimedia subsystem (IMS). IMS is an architectural framework for delivering IP multimedia services, and in one instance, uses the Session Initiation Protocol (SIP) to communicate information between components. Exemplary components of an IMS network may include a home subscriber server (HSS), a call session control function (CSCF), application servers, media servers (e.g., media resource function (MRF)), and breakout gateway control function (BGCF), Public Switched Telephone Network (PSTN) gateways. IMS networks generally aid in the access of multimedia and voice applications from wireless and wireline terminals. As such, in one embodiment, the call-control component 220 is a call session controller function (CSCF) that is used to process SIP signaling packets. There are various types of CSCFs, including a proxy CSCF, a serving CSCF, and an interrogating CSCF. The proxy CSCF is a SIP proxy that provides subscriber access to network-based services. The serving CSCF is the primary call controller for the operator network, and the interrogating CSCF is a SIP proxy that can be optionally used by a network operator to hide internal configurations.

Further, in an embodiment, the subscriber server 230 is a home subscriber server (HSS), which handles centralized provisioning, management, and authentication and authorization of the mobile device to the network. Prior to a SIP connection, the CSCF consults with the HSS, in that, as mentioned above, the CSCF may download a user-service profile associated with the mobile device. The HSS may include various components, such as a home location register (HLR) and an authentication center (AC). The HLR is a database that stores and manages subscriptions, and that stores permanent information about subscribers, such as the user-service profiles, location information, and activity status. In one embodiment, a "Cx" interface, used with the Diameter protocol, is used for communication between the CSCF and the HSS. As noted above, the subscriber server 230 and the subscription manager 240 communicate so that the subscription manager 240 is aware of when the mobile device is registered and when it is no longer registered with the network. The interface used to communicate this information may be a "Sh" interface, which is an interface used in conjunction with the Diameter protocol.

Figure 3:
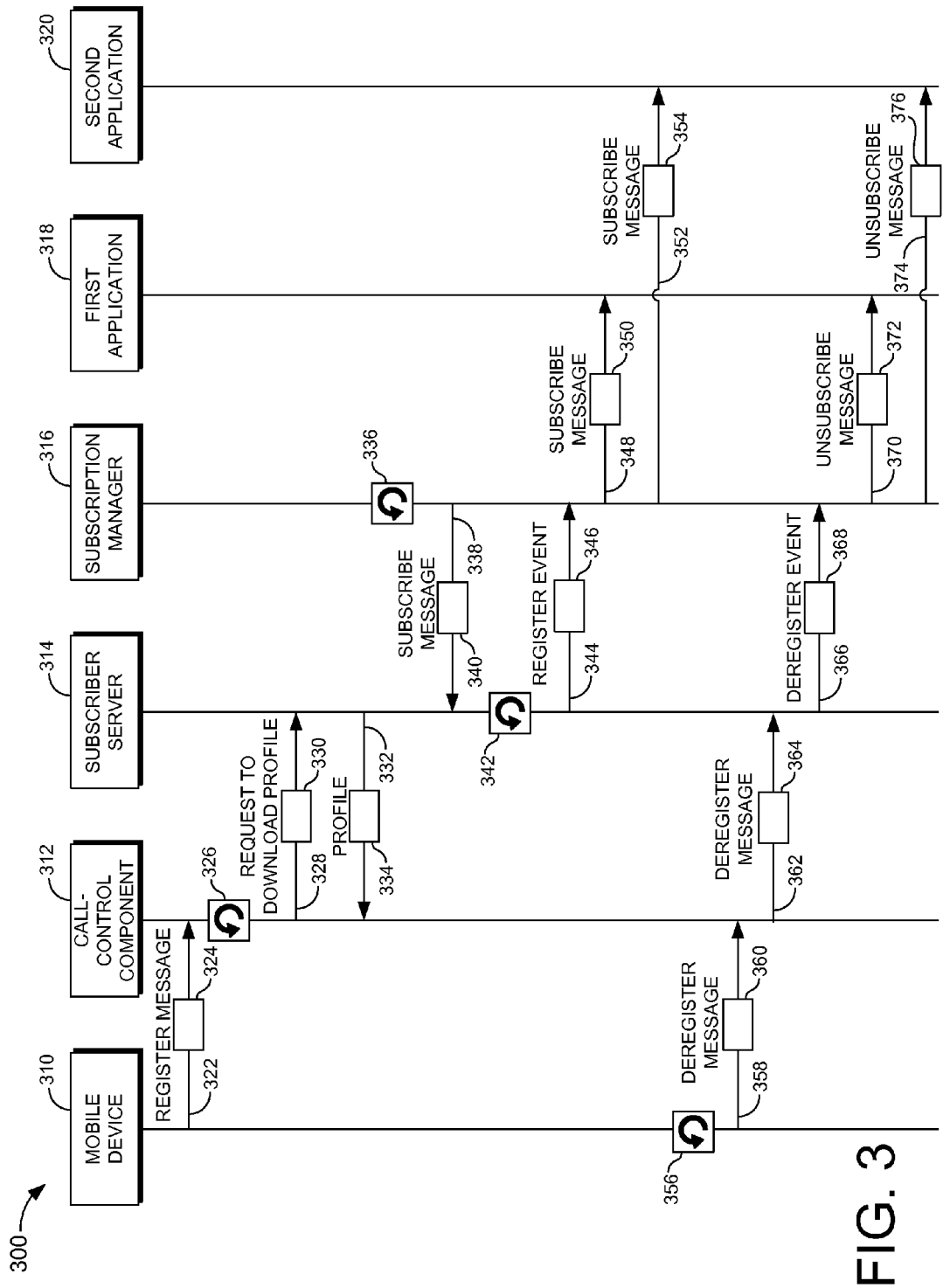
FIG. 3 depicts an illustrative flow diagram for managing subscribe and unsubscribe messages sent to various applications that are accessible by a mobile device.

Turning now to FIG. 3, an illustrative flow diagram for managing subscribe and unsubscribe messages sent to various applications that a mobile device is authorized to use is depicted. The embodiment of FIG. 3 includes various components, which have each been described herein in relation to FIG. 2. These components include a mobile device 310, a call-control component 312, a subscriber server 314, a subscription manager 316, a first application 318, and a second application 320. Initially, the mobile device 310 communicates 322 a register message 324 to the call-control component 312 indicating that the mobile device 310 would like to register with the network. The register message may include information needed to register the mobile device onto the network. For exemplary purposes and not limitation, this information may include a user identification, such as an international mobile subscriber identify (IMSI), a temporary mobile subscriber identify (TMSI), an international mobile equipment identity (IMEI), a mobile subscriber ISDN number (MSISDN), or the like. IMSI is a unique phone identity, and TMSI is generated based on a geographical location of the mobile device meant to improve privacy. IMEI is a unique device identity and is phone specific, while MSISDN is a telephone number of a user.

At step 326, the call-control component 312 may perform various functions, such as determining an identifier associated with the mobile device 310, and based on this, determining a home domain of the mobile device 310. The call-control component 312 then communicates 328 a request to download a user-service profile 330 from the subscriber server 314. As mentioned, the subscriber server 314 is responsible for storing user-service profiles corresponding to the mobile devices. The subscriber server 314 then communicates 332 the user-service profile 334 back to the call-control component 312 such that the user-service profile is downloaded onto the call-control component 312. As previously mentioned, a provisioning feed sends various information to the subscription manager 316, including the applications to which the mobile device 310 has access. This is shown at step 336. The subscription manager 316 then communicates 338 a subscribe message 340 to the subscriber server 314 indicating that the subscription manager 316 wants to know when a particular mobile device, such as mobile device 310, is registered or unregistered with the network so that it knows when to send subscribe and unsubscribe messages to the applications.

It should be noted that various steps shown in FIG. 3 are shown in a particular order. FIG. 3 is illustrated simply as one embodiment of the invention. As such, the steps may be performed in a different order as shown in FIG. 3. For example, steps 336-340 may be performed prior to the mobile device being registered with the network, or may be performed later in the process shown in FIG. 3. The steps shown are not intended to limit the order in which the steps are performed in embodiments other than the embodiment of FIG. 3.

At step 342, the subscriber server 314 determines that the mobile device 310 has registered with the network. The subscriber server 314 then provides an indication as to the registration status of the mobile device 310 by communicating 344 a register event 346 to the subscription manager 316, thus indicating that the mobile device 310 is registered with the network. The subscription manager 316, in one embodiment, may access its local database to determine a subscription status of each application that is accessible to the mobile device 310. Any applications that currently have an unsubscribed status may be sent a subscribe message. As shown, a subscribe message 350 is communicated 348 to a first application 318, and a subscribe message 354 is also communicated 352 to a second application 320. In one instance, the subscription manager 316 has the intelligence to determine the application to which a subscribe message is sent based on the importance of each application to the user of the mobile device 310. The applications may be prioritized according to the user; or according to an algorithm used by the subscription manager 316, which may determine which applications are subscribed to the mobile device 310; or according to another factor.

At step 356, the mobile device 310 takes some action that indicates that it is to be deregistered from the network. This action may occur at any time after it has registered with the network, such as when the phone is turned off, when a timer has expired, etc. The mobile device 310 then communicates 358 a deregister message 360 to the call-control component 312, which forwards 362 the deregister message 364 to the subscriber server 314. A deregister event 368 is communicated 366 to the subscription manager 316 so that it is aware that the mobile device is no longer registered with the network. As described herein, the subscription manager 316 subscribes to the register event for the mobile device 310. As a result, the subscription manager 316 is notified each time that mobile device 310 registers or deregisters from the network. As a result of being notified that the mobile device 310 has deregistered from the network, the subscription manager 316 communicates 370 an unsubscribe message 372 to the first application 318, and also communicates 374 an unsubscribe message 376 to the second application 320.

FIG. 4 depicts an illustrative method 400 for managing subscription messages that are communicated to various applications that are accessible by a mobile device, in accordance with an embodiment of the present invention. Initially, an indication is received at step 410 of applications that are accessible to a mobile device. The mobile device, at this point, may have or may not have already been registered with the communications network. The mobile device registers with the communications network, in one embodiment, by communicating a registration request to the call-control component, which downloads a user-service profile corresponding to the mobile device from the subscriber server. These applications may include any type of software that can be used by a mobile device, such as voicemail, gaming, presence, GPS, or the like. Whether or not a mobile device has access to an application may depend on whether the user of the mobile device has signed up for a particular application, whether the user of the mobile device subscribes to the applications, such as a paid subscription, etc. Many times, this determination is predetermined, and an indication of the applications to which the mobile device can access are stored in a database, which may include, in one embodiment, the subscriber server.

At step 420, a registration notification is requested. The registration notification indicates that the mobile device becomes registered with a communications network. The requesting of a registration notification is also termed subscribing for a registration event, as mentioned above. The subscription manager subscribes for a registration event associated with a particular mobile device, and another component, such as a subscriber server, is notified that it is to alert the subscription manager anytime that mobile device registers with or deregisters from the network. In one embodiment, the communications network is an IMS network having components such as an HSS, a CSCF, application servers, media servers (e.g., MRF), BGCF, and PSTN gateways. The registration notification is received at step 430 at the subscription manager. In one embodiment, a subscriber server, such as an HSS, communicates the registration notification to the subscription manager, and the registration notification may be communicated by way of an Sh interface, which is associated with Diameter protocol.

At step 440, the subscription manager communicates a subscribe message to the applications on behalf of the mobile device. These applications may include at least one application to which the mobile device has access. In one embodiment, the subscription manager accesses a database to determine which applications to which the mobile device is currently subscribed. As a result, the subscription manager may send a subscribe message on behalf of the mobile device to at least one of the applications to which the mobile device is not currently subscribed. There is no need for the subscription manager to send a subscribe message to those applications to which the mobile device is currently subscribed. The subscribe message enables the mobile device to communicate with the applications to which the subscribe message is sent. Subscribe messages may include various information, including, for example and not limitation, location information associated with the subscribe message, an expiration time associated with the subscribe message, and an IP address corresponding to the mobile device. Some subscribe messages may contain all of this information, some may contain none, and others may contain one or more of the types of information listed above. Location information may be used, for example, for applications that provide location-based services. Further, many subscribe messages expire after a certain time (e.g., 30 minutes, 2 hours, 24 hours, 72 hours), and therefore may include an expiration timer indicating when a new subscribe message is to be sent before the subscription expires.

In one embodiment, as detailed above in relation to FIG. 3, the mobile device will deregister from the network at some time after it becomes registered. A deregistration notification may then be communicated to the subscription manager by, for instance, the subscriber server, The deregistration notification may be sent to the subscription manager as a result of the subscription manager subscribing to the register event for the mobile device (e.g., requesting a registration notification). The subscription manger may then determine which of the applications to which an unsubscribe message is to be sent and may communicate the unsubscribe message to each of the applications to which the mobile device is subscribed. This effectively unsubscribes the mobile device from these applications. Subscribe and unsubscribe messages may be sent from the subscription manager to the applications by way of an interface used in conjunction with SIP.

Some of the responsibilities of the subscription manager include prioritizing subscribe and unsubscribe messages sent to the applications, as well as managing notifications that are to be sent to the mobile device from the applications. For example, subscribe messages may be sent at the same time to the applications to which the mobile device has access, or may be sent based on a predetermined priority. This predetermined priority may be determined by a user of the mobile device, or may be determined by an algorithm that includes intelligence to identify those applications to which subscribe messages should be sent first. In one embodiment, the subscription manager may determine the applications to which a subscribe message is to be sent depending on the type of mobile device that has registered with the network. For example, a single user may be associated with a mobile phone and a laptop. The laptop may be able to use different applications than the mobile phone, and therefore just because the user of both devices is allowed access to a certain application doesn't mean the device should be subscribed to all of these applications each time it becomes registered with the network. The subscription manager may have the intelligence to know that if the device is a laptop, only certain applications need to be sent a subscribe message, but if the device is a mobile phone, other applications need to be sent a subscribe message.

As mentioned, the subscription manager may also manage the transmittal of the notifications sent from the applications to the mobile device. Some applications may have a predetermined priority over the others, and thus, in one embodiment, the notifications from these priority applications may be sent to the mobile device prior to other notifications. In another embodiment, in order to decrease traffic across the network, notifications sent to the subscription manager may be collected by the subscription manager over a certain amount of time (e.g., 1 minute, 5 minutes, 30 minutes) and sent to the mobile device in one message, as opposed to sending an individual message to the mobile device each time a notification arrives at the subscription manager. Further, in one embodiment, the subscription manager has the intelligence (e.g., by way of an algorithm or status notifications) to know the status of the user of the mobile device, such as whether the user is currently on a call, in a meeting, or away from his mobile device. In these instances, the subscription manager may hold the notifications until the user's status has changed, or until the user is no longer on a call, and then send the notifications either all at once or based on priority of the notifications.

Referring now to FIG. 5, a method 500 is shown for managing subscription messages that are communicated to various applications that are accessible by a mobile device, in accordance with an embodiment of the present invention. Initially, a registration notification is retrieved at step 510 for the mobile device's IMS registration. The registration notification indicates that the mobile device has registered with a communications network, such as an IMS network, thus enabling the mobile device to communicate with one or more applications to which it has access. Retrieving the registration notification may include the subscription manager requesting from a component, such as a subscriber server, that it be notified when a particular mobile device registers with or deregisters from the network. This may also be described as the subscription manager subscribing for a register event associated with the mobile device. The subscription manager is then sent a registration notification when the mobile device becomes registered with the network, and a deregistration notification when the mobile device becomes deregistered from the network.

At step 520, the mobile device is subscribed to the various applications by way of the subscription manager. These applications are ones that are accessible to the mobile device. Subscribing the mobile device to the applications may include various steps, including a determination of the applications to which the mobile device has access. As previously mentioned, one embodiment includes a provisioning feed that informs the subscription manager as to those applications to which the mobile device has access. In another embodiment, the subscriber server sends the subscription manager, in addition to the registration notification, an indication of the applications to which the mobile device can access. Further, the subscription manager may access a database to determine a current status of each of the applications. The current status may be a subscribed status or an unsubscribed status. A subscribe message may be communicated to those applications that currently have an unsubscribed status. The subscribe message may include one or more of location information associated with the mobile device, an expiration time associated with the subscribe message, or an IP address corresponding to the mobile device. As mentioned, only a subset of these applications may be sent a subscribe message, as the subscription manager, in one embodiment has the intelligence to determine the applications to which the user of the mobile device wishes to be subscribed. These may include a voicemail application, for example.

A deregistration notification is received at step 530, which indicates that the mobile device is no longer registered with the IMS network. At step 540, an unsubscribe message is communicated to at least one of the applications to which the mobile device is currently subscribed, thus unsubscribing the mobile device from these applications.

Figure 6:
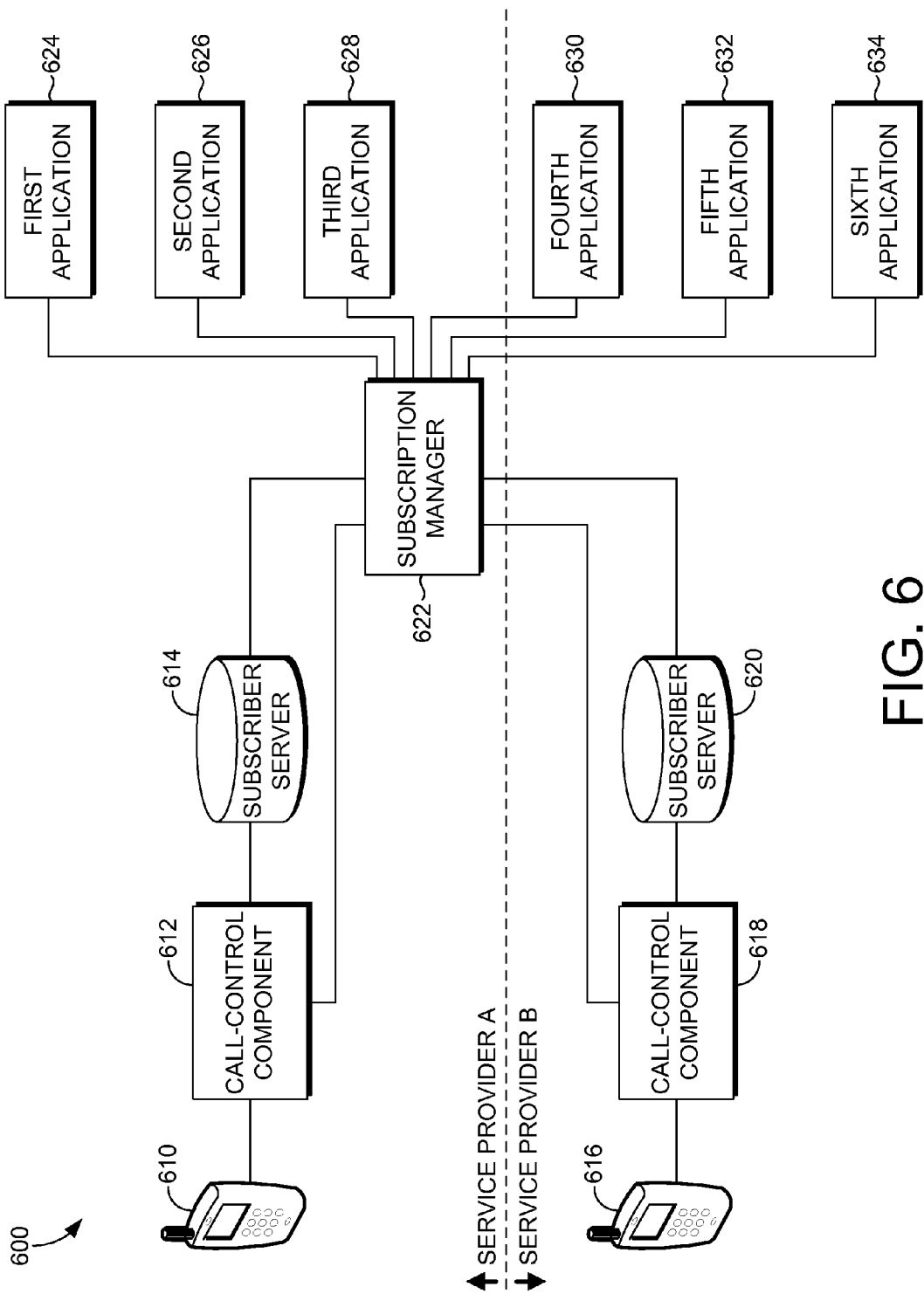
FIG. 6 depicts an illustrative operating environment suitable for practicing an embodiment of the present invention.

FIG. 6 depicts an illustrative operating environment 600 suitable for practicing an embodiment of the present invention. Like the embodiment described in relation to FIG. 2, a subscription manager manages subscribe and unsubscribe messages sent from the device to one or more applications to which the mobile device has access. The embodiment of FIG. 6, however, allows for a subscription manager to manage subscribe and unsubscribe messages for a mobile device and various applications that are associated with a foreign network, or a network that is different than the network that is associated with the subscription manager (e.g., the home network). For instance, service provider A may lease its services provided by a subscription manager to other service providers, such as service provider B. As shown in FIG. 6, a mobile device 610, a call-control component 612, and a subscriber server 614 may each be associated with a service provider A. This association means that these components are owned by, located within, operated by, leased by, etc., service provider A, which in one embodiment, is a wireless service provider.

Service provider B's network may include, at least, a mobile device 616, a call-control component 618, and a subscriber server 620. These components perform the same or similar functions as those in service provider A's network. For instance, the call-control component 618 manages the registrations of mobile devices with the service provider's network, which, in one embodiment, is an IMS network. The call-control component 618 has the intelligence to route calls placed by a mobile device, such as mobile device 616. The mobile device 616 sends a registration request to the call-control component 618, which in turn downloads the user-service profile associated with the mobile device 616 from a subscriber server 620. The subscriber server 620 is generally a database where subscribers are provisioned and stores the user-service profiles that indicate which services or applications the mobile device can access. The subscriber server 620 also handles calls, as it contains subscription-related information in the form of the user-service profiles, and also performs authentication and authorization of the mobile device to the network. Additionally, the subscriber server 620 contains other information associated with the mobile device, including its physical location and IP information, such as the IP address corresponding to the mobile device.

As mentioned, the subscription manager 622 performs the same functions as those described in relation to subscription manager 240 in FIG. 2. For instance, subscription manager 622 manages the subscription of the mobile device to various applications to which the mobile device 210 has access. But here, one or more of the mobile devices and the applications are associated with a different service provider, such as service provider B. In one embodiment, the mobile device is associated with a foreign network (e.g., service provider B's network) and the subscription manager and the applications are associated with a home network (e.g., service provider A's network). In another embodiment, the mobile device is associated with a home network (e.g., service provider A's network) and the applications are associated with a foreign network (e.g., service provider B's network). In yet another embodiment, both the mobile device and the applications are associated with a foreign network (e.g., service provider B's network) while the subscription manager 622 is associated with the home network (e.g., service provider A's network).

While traditionally the mobile device sends subscribe and unsubscribe messages to the applications at a time interval dependent upon an expiration timer contained in each message, here, the subscription manager 622 is responsible for sending these messages to the applications on behalf of the mobile device, whether the applications and/or the mobile device are associated with a foreign network or the home network. As a result, the number of messages and information passing through the network drastically decreases, thus reducing traffic from the carrier interfaces.

A provisioning feed is sent to the subscription manager 622 and the applications, and includes various types of information. The provisioning feed may be sent by some upstream source. For example, a provisioning feed sent to the subscription manager 622 may include an indication of those applications to which various mobile devices, such as mobile devices 610 and 616, can access, including applications that are associated with other service providers, such as foreign networks. In one embodiment, a home network and a foreign network, such as service providers A and B, may have a preexisting relationship that allows the subscription manager 622 to manage subscriptions for mobile devices associated with the foreign network. The relationship may also allow the subscription manager 622 to subscribe a mobile device to applications associated with the foreign network.

In one embodiment, the provisioning feed includes an indication of those applications that the mobile device is attempting to access so that the subscription manager 622 knows the applications to which to send a subscribe message once the device has registered with the network. The subscription manager 622 manages the subscription of the mobile device 610 or 616 to the applications, including a first application 624, a second application 626, a third application 628, a fourth application 630, a fifth application 632, and a sixth application 634. While six applications are shown in FIG. 6, it is contemplated that any number of applications may be accessible to a mobile device. Six applications are shown as only one exemplary embodiment of the present invention. As shown here, applications 624, 626, and 628 are associated with service provider A's network, while applications 630, 632, and 634 are associated with service provider B's network.

The subscription manager 622 is alerted when a mobile device registers with the network. For instance, as described above, the subscription manager may communicate a subscription (e.g., a one-time subscription) to the subscriber server 614 to subscribe to a registration event corresponding to a mobile device or multiple mobile devices associated with service provider A. Similarly, the subscription manager 622 may subscribe to a registration event corresponding to mobile devices in foreign networks, such as mobile device 616 associated with service provider B. The registration event indicates to the subscription manager 622 whether the mobile device has become registered with or unregistered from the communications network. In one embodiment, the mobile device registers with the network per standard RFC3265.

Depending on which network the mobile device is associated with, the subscriber server in that network (e.g., subscriber server 614 or 620) responds to the subscription manager 622 by communicating a message to the subscription manager 622 with either a register or a deregister event. These events indicate the mobile device's current registry status. Once the subscription manager 622 is aware that the mobile device is registered, it may proceed to send subscribe messages to one or more of the applications that can be accessed by the mobile device, whether the applications are in the home or foreign network. Similarly, the subscriber server 614 or 620 may send a deregister notification to the subscription manager 622 when the mobile device has deregistered from the network. The subscription manager 622 may then send out unsubscribe messages to the one or more applications to which the mobile device is currently subscribed, including applications 624, 626, 628, 630, 632, and 634.

In one embodiment, the networking environment of FIG. 2 is an Internet protocol (IP) multimedia subsystem (IMS). IMS is an architectural framework for delivering IP multimedia services and, in one instance, uses the Session Initiation Protocol (SIP) to communicate information between components. Exemplary components of an IMS network may include a home subscriber server (HSS), a call session control function (CSCF), application servers, media servers (e.g., media resource function (MRF)), breakout gateway control function (BGCF), and PSTN gateways. IMS networks generally aid in the access of multimedia and voice applications from wireless and wireline terminals. As such, in one embodiment, the call-control components 612 and 618 are call session controller functions (CSCF) that are used to process SIP signaling packets. The various types of CSCFs are described above in relation to FIG. 2. Further, in one embodiment, the subscriber servers 614 and 620 are home subscriber servers (HSS), which handle centralized provisioning, management, and authentication and authorization of the mobile device to the network.

The embodiment of FIG. 6 illustrates how a subscription manager is able to manage the subscription of a mobile device to one or more applications when the mobile device and/or the applications are associated with a network or domain that is different than the network associated with the subscription manager. This effectively allows the subscription manager 622 to manage subscriptions for mobile devices located in a different network, or to manage subscriptions for a mobile device when the subscriptions are for applications associated with a different network, such as a competitor's network. For instance, multiple applications associated with service provider A may seek registration across several IMS-enabled networks, including, for example, service provider B's network. Instead of the mobile device sending subscribe and unsubscribe messages directly to the applications, it can now send them to the subscription manager, even if the subscription manager is associated with a different network, so long as the two networks (e.g., home network and foreign network) have an established relationship that allows for this.

When a subscribe message or an unsubscribe message is sent from the subscription manager 622 associated with service provider A to an application associated with service provider B, the message must cross a security boundary (e.g., border) that separates the two networks or domains. A border refers to a point of demarcation between one part of a network and another, such as the edge of a corporate network, where some type of security protection may be located. Further, when the subscription manager 622 receives a notification from the subscriber server 620 located in a foreign network that indicates whether the mobile device 616, also located in the foreign network, is registered with the network, this message must also cross a security boundary between the two networks. Depending on the security protection set up by individual service providers, the security boundary may include, for instance, one or more session border controllers (SBC), one or more firewalls, or the like. An SBC is a device used to exert control over the signaling and media streams involved in setting up, conducting, and tearing down telephone calls or other interactive media communications. SBCs are typically positioned between two service provider networks in a peering environment and commonly offer security in protecting the network and other devices from attacks. Information, in one embodiment, is transferred across the border by way of a network-to-network interface (NNI).

Referring to FIG. 7, an illustrative flowchart is shown of a method 700 for managing subscription messages for a foreign network, the subscription messages being communicated to various applications that are accessible by a mobile device, in accordance with an embodiment of the present invention. Initially, at a home network, an indication of the applications to which a mobile device, associated with a foreign network, has access is received, shown at step 710. The home network may be a first service provider's network, and the foreign network may be a second service provider's network. The home network and the foreign network, in one embodiment, are IP multimedia subsystem networks. This information may be received by way of a provisioning feed, as described above. In one embodiment, in order for a subscription manager in a home network to manage subscriptions for a mobile device in a foreign network, or for the subscription manager in a home network to communicate subscribe messages to applications associated with a foreign network, the home and the foreign networks may have an established relationship. This preexisting, established relationship also allows for information, such as subscribe messages or registration notifications to be communicated from one network to another.

At step 720, a registration notification is received from the foreign network. The registration notification indicates that the mobile device is currently registered with the foreign network. In one instance, the registration notification is communicated to the subscription manager by way of a "Sh" interface. To register with the foreign network, the mobile device communicates a register message to a call-control component, such as call-control component 618 described in relation to FIG. 6. The register message indicates that the mobile device would like to register with the network and may include information needed to register the mobile device onto the network. For exemplary purposes and not limitation, this information may include a user identification, such as an IMSI, a TMSI, an IMEI, an MSISDN, or the like. IMSI is a unique phone identity, and TMSI is generated based on a geographical location of the mobile device meant to improve privacy. IMEI is a unique device identity and is phone specific, while MSISDN is a telephone number of a user.

The call-control component may perform various functions, such as determining an identifier associated with the mobile device, and based on this, determining a home domain of the mobile device. The call-control component then communicates a request to download a user-service profile from the subscriber server, such as the subscriber server 620 described in relation to FIG. 6. As mentioned, the subscriber server is responsible for storing user-service profiles corresponding to the mobile devices. The subscriber server then communicates the user-service profile back to the call-control component such that the user-service profile is downloaded onto the call-control component. At this point, the mobile device is registered with the network. The subscription manager may subscribe to the mobile device's registration event, thus requesting a registration request from the subscriber server. In one embodiment, the subscriber server is an HSS and the call-control component is a CSCF. Both may communicate with other components by way of SIP.

Returning to FIG. 7, at step 730, a subscribe message is communicated to the applications to which the mobile device has access, regardless of whether the applications are associated with the home network or the foreign network. The subscribe message enables the mobile device to communicate with the applications to which the subscribe message is sent. To determine which applications to which the mobile device is currently subscribed, a database in the home network may be accessed. The database may be updated in real-time or close to real-time such that it contains accurate information as to which mobile devices are currently subscribed to which applications. In one embodiment, the subscription manager manages a prioritization of the subscribe messages communicated to the applications such that if one application is flagged or marked as being of more importance than another application, the more important application would receive a subscribe message before the other less important application.

In one embodiment, at least a portion of the applications to which the subscribe message is sent are associated with the foreign network and, as such, the subscribe message is communicated across a security border, as described above in relation to FIG. 6. For instance, depending on the security protection set up by individual service providers, the security boundary may include, for instance, one or more session border controllers (SBC), one or more firewalls, or the like. Information may be transferred across the border, in one embodiment, by way of a network-to-network interface. As also mentioned above, the subscribe message may include various types of information, including, at least, location information associated with the mobile device, an expiration time associated with the subscribe message, an IP address corresponding to the mobile device, an identification of the home network, etc.

Further, a deregistration notification may be received from the foreign network indicating that the mobile device is no longer registered with the foreign network. Once this happens, an unsubscribe message is communicated to the applications to which the mobile device is currently subscribed, thereby unsubscribing the mobile device from the applications. The subscribe and unsubscribe messages that are communicated to the applications, in one embodiment, are communicated by way of SIP.

Turning now to FIG. 8, an illustrative flowchart of a method 800 for managing subscription messages for a foreign network is shown, wherein the subscription messages are communicated to various applications that are accessible by a mobile device, in accordance with an embodiment of the present invention. At step 810, a registration message is received stating that the mobile device is currently registered with a foreign network. This registration message is received at a home network. At step 820, identifications of applications are received, wherein the applications are accessible to the mobile device.

At least one of the applications is determined to be associated with the foreign network at step 830. Generally, an application is associated with the foreign network by way of being owned, operated, or being leased by a service provider associated with the foreign network. As such, both the mobile device and one or more of the applications are not associated with the home network, and thus the subscription manager, which is associated with the home network, may be leased by the foreign network from the home network. If this is the case, information, such as subscribe messages, unsubscribe messages, and registration notifications are communicated across the border between networks. Depending on the security protection set up by individual service providers or networks, the security boundary may include, for instance, one or more session border controllers (SBC), one or more firewalls, or the like, and an NNI may be used to transfer the information. In another instance, a virtual private network (VPN) is used to communicate the subscribe message from one network to another. A VPN is a computer network that creates a private scope of computer communications and that provides a secure extension of a private network into an insecure network, such as the Internet.

At step 840, it is determined that the home network has an established relationship with the foreign network, which allows the subscription manager in the home network to manage subscriptions of the applications on behalf of the mobile device, even if the mobile device is associated with the foreign network. The subscribe message is communicated to the applications at step 850. Because the application may be located in a foreign network, the subscribe message may be communicated from the home network to the foreign network.

Figure 9:
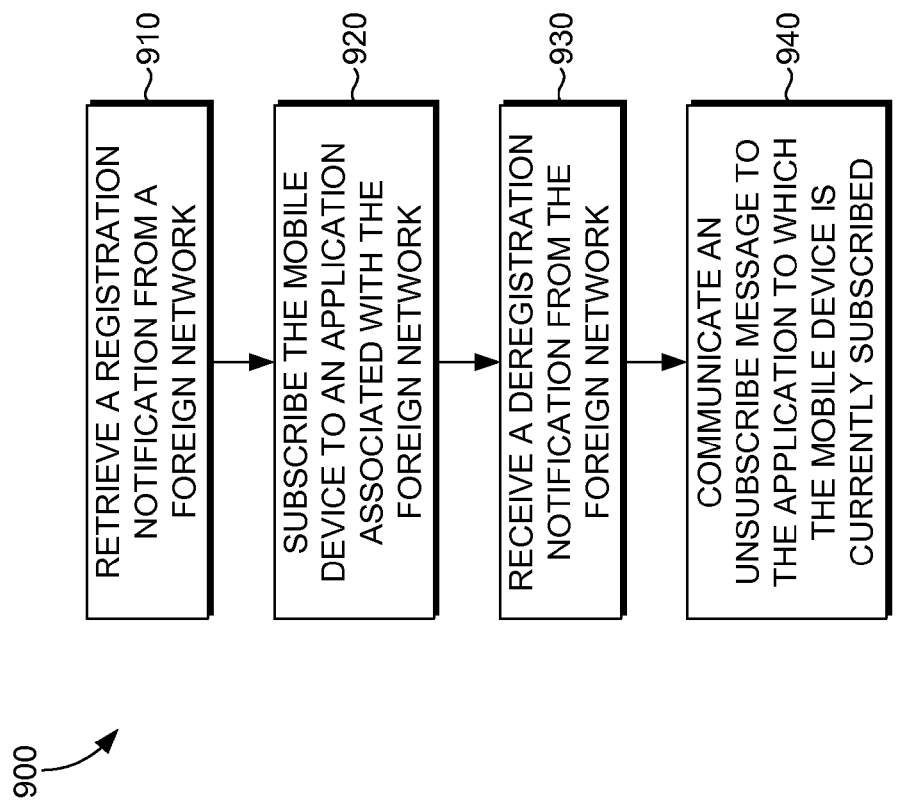

FIG. 9 depicts an illustrative flowchart of a method 900 for managing subscription messages for a foreign network, the subscription messages being communicated to various applications that are accessible by a mobile device, in accordance with an embodiment of the present invention. At step 910, a registration notification is retrieved from a foreign network. The registration notification indicates that the mobile device has registered with an IP multimedia subsystem network in the foreign network. The IMS network enables the mobile device to communicate with the applications accessible to the mobile device. At step 920, the mobile device is subscribed to an application associated with the foreign network. Subscribing the mobile device to applications initially includes determining that the mobile device has access to the applications. In one instance, this includes accessing a database that contains identifications of applications to which various mobile devices have access. Or, a provisioning feed is sent to the subscription manager alerting the subscription manager as to which applications are accessible to the mobile device.

Further, a database may be accessed to determine a current status of each application. A current status may be a subscribed status or an unsubscribed status. If it is determined that an application has an unsubscribed status and that application is accessible to the mobile device, a subscribe message is communicated to the application, thereby enabling the mobile device to communicate with the application. A subscribe message may include one or more of location information associated with the mobile device, an expiration time associated with the subscribe message, an IP address corresponding to the mobile device, or an identification of the home network, such that the receiving application knows from where the subscribe message is coming. As mentioned above, applications may be associated (e.g., owned, leased, operated) with a home network or a foreign network, and if associated with a foreign network, the subscribe message is communicated across a security boundary, such as a border, between the home and foreign networks. The security boundary may include one or more of a session border controller or a firewall. Some boundaries may include more than one of an SBC and/or a firewall. The information, such as the subscribe message, may be communicated by way of an NNI.

At step 930, a deregistration notification is received from the foreign network indicating that the mobile device is no longer registered with the IMS network. As such, an unsubscribe message is communicated to the application to which the mobile device is currently subscribed, shown at step 940. Now, the mobile device is unsubscribed from this application.

Figure 10:
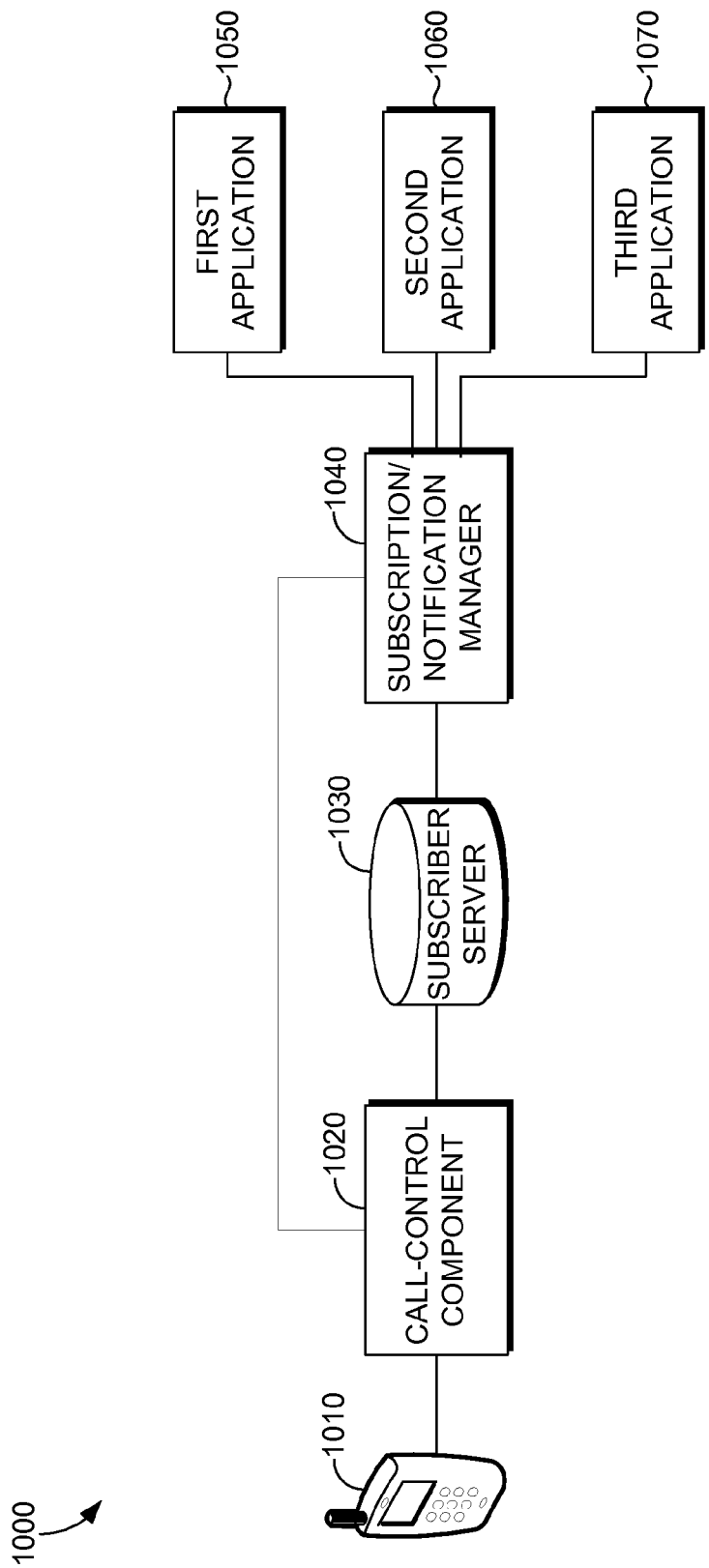
FIG. 10 depicts an illustrative operating environment suitable for practicing an embodiment of the present invention.

Referring to FIG. 10, an illustrative operating environment 1000 suitable for practicing an embodiment of the present invention is shown. FIG. 10 appears similar to FIG. 2, but includes several differences. Initially, FIG. 10 includes a mobile device 1010, a call-control component 1020, and a subscriber server 1030, all of which have been described in detail above. The components illustrated in FIG. 10 are included to provide an illustrative example of components that may be used, but it is contemplated that more or less components than those shown may be included to carry out the embodiment of the present invention described with respect to FIG. 10. Here, though, a subscription/notification manager 1040 is illustrated. FIG. 2 includes a subscription manager, but here, a notification manager has been added. It should be noted that while the subscription manager and the notification manager are illustrated as a single component, other embodiments of the present invention use a separate component for each of the subscription manager and the notification manager. Generally, when a mobile device is subscribed to an application, that application sends notifications directly to the mobile device. A notification indicates an occurrence of an event associated with one of the applications from which the notification is sent. One such example of a notification is a voicemail message that is sent from a voicemail application to the mobile device. Another example is a presence application that sends notifications to a mobile device of updates of another user's location. Weather updates are another example of notifications that are sent from a weather application to a mobile device.

Further, three applications are illustrated in FIG. 10, including a first application 1050, a second application 1060, and a third application 1070. While subscribe and unsubscribe messages are sent from the subscription/notification manager to the applications, notifications are sent from the applications to the subscription/notification manager 1040. Notifications that are received by the subscription/notification manager 1040 are collected, queued, and sent to the mobile device in a configurable periodic manner. The manner in which the notifications are sent to the mobile device may vary, but in one embodiment, notifications sent to the subscription/notification manager 1040 are held for a certain period of time, such as for five minutes, for example, and every five minutes, the notifications are sent to the mobile device in the form of a single notification message. This greatly reduces the amount of traffic on the network thus increasing the network efficiency. Additionally, the user of the mobile device receiving the notifications may not want to receive a presence update each time another user moves location, but may want to know every five, ten, or fifteen minutes, for example, where that user is located.

In another embodiment, the notifications are held at the subscription/notification manager 1040 until a certain predetermined number of notifications have been received, and once that number of notifications has been received, a notification message is sent to the mobile device that includes those notifications. In still another embodiment, how and when notifications are sent to the mobile device depends on the current amount of traffic on the network at that particular time. If network congestion is sensed, the notifications may be held until a time when less congestion is present on the network. In a further embodiment, the type of service provided by the application dictates when and how the notifications are sent to the mobile device. For instance, a user of the mobile device may want to receive voicemails immediately after they are left on the voicemail system but may not want or need to receive notifications relating to the weather each time they are issued or sent by the weather application. In one instance, the notifications that are included in a notifications message may be from a single application, or may be from more than one application. Once received by the subscription/notification manager 1040, the notification manager sends the notification message to the mobile device 1010 through the call-control component 1020. While the same or similar components are illustrated in FIG. 10 and other figures described herein, the components in FIG. 10 have been given different reference numbers for ease of discussion. Different numbers does not necessarily imply that the components are different.

Figure 11:
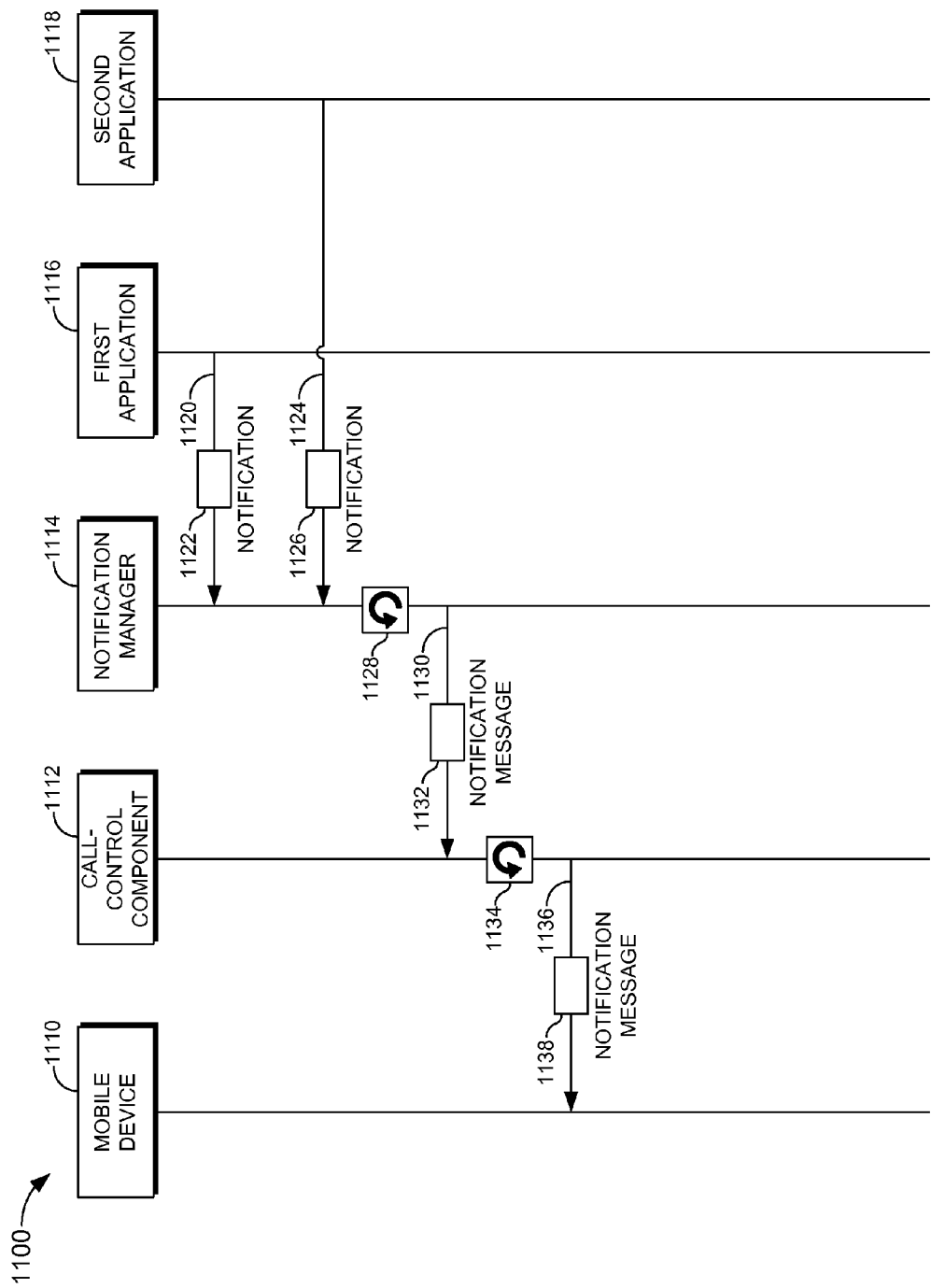
FIG. 11 depicts an illustrative flow diagram for managing notification messages sent by various applications to a mobile device, in accordance with an embodiment of the present invention.

FIG. 11 depicts an illustrative flow diagram 1100 for managing notification messages sent by various applications to a mobile device, in accordance with an embodiment of the present invention. Initially, the flow diagram of FIG. 11 includes various components, including a mobile device 1110, a call-control component 1112, a notification manager 1114, a first application 1116, and a second application 1118. The components illustrated in FIG. 11 are provided for an illustrative example of components that may be used, but it is contemplated that more or less components than those shown may be included to carry out the embodiment of the present invention described with respect to FIG. 11. As such, although two applications are illustrated in FIG. 11, less or more than two may be provided. Here, the first application 1116 communicates 1120 a notification 1122 to the notification manager 1114, and the second application 1118 also communicates 1124 a notification 1126 to the notification manager 1114. These notifications may be received at the notification manager 1114 at the same time, or at different times.

The notification manager 1114, at step 1128, determines how and when the notifications are to be communicated to the mobile device 1110. Notifications may be sent to the mobile device 1110 according to one or more of several factors. For instance, in one embodiment, notifications sent to the notification manager 1114 are held for a certain period of time, such as for five minutes, for example, and every five minutes, the notifications are sent to the mobile device in the form of a single notification message. This greatly reduces the amount of traffic on the network thus increasing the network efficiency. Additionally, the user of the mobile device receiving the notifications may not want to receive a presence update each time another user moves location but may want to know every five, ten, or fifteen minutes, for example, where that user is located. The time interval may be determined by the user, the service provider, or may be automatically determined based on other factors, including the time of the day, user settings, etc.

In another embodiment, the notifications are held at the notification manager 1114 until a certain predetermined number of notifications have been received, and once that number of notifications has been received, a notification message is sent to the mobile device that includes those notifications. In still another embodiment, how and when notifications are sent to the mobile device depends on the current amount of traffic on the network at that particular time. If network congestion is sensed, the notifications may be held until a time when less congestion is present on the network. In a further embodiment, the type of service provided by the application dictates when and how the notifications are sent to the mobile device. For instance, a user of the mobile device may want to receive voicemails immediately after they are left on the voicemail system but may not want or need to receive notifications relating to the weather each time they are issued or sent by the weather application. In one instance, the notifications that are included in a notifications message may be from a single application, or may be from more than one application.

Regardless of when or how the notifications are determined to be communicated to the mobile device 1110, a notification message 1132 is communicated 1130 to the call-control component 1112, which determines, at step 1134, the mobile device to which the notification message is to be sent and may also determine a route to send the message. The call-control component 1112 then communicates 1136 the notification message 1138 to the mobile device 1110, which receives the notification message 1138 and may display the various notifications on the device. As mentioned, although two notifications 1122 and 1126 are illustrated in FIG. 11 as being sent to the notification manager 1114, any number of notifications may be sent to the notification manager 1114.

In one embodiment, the mobile device and/or one or more of the applications are located in a foreign network. As such, the notifications and/or the notification message may be communicated across a security boundary, such as a border. As discussed above, one or more of a firewall or an SBC may be used to keep harmful information out of the network. The home and foreign networks may have an established relationship such that each network is already aware of the other network and knows to allow information from the other network. Information may be transferred to the other network by way of an NNI.

Turning to FIG. 12, an illustrative flowchart of a method 1200 for managing notification messages that are communicated from various applications and that are intended for a mobile device is shown, in accordance with an embodiment of the present invention. Initially, a plurality of notifications are received from the applications that are accessible by the mobile device, shown at step 1210. Each of the notifications indicates an occurrence of an event associated with one of the applications from which the notification was sent. Notifications may be continuously received at the notification manager. At step 1220, it is determined that the mobile device is currently registered with a communications network. The communications network may be the home network or a foreign network. In one instance, the communications network is an IMS network. Registrations typically take place by the mobile device sending a registration request to a call-control component that downloads from the subscriber server a user-service profile corresponding to the mobile device. A registration notification may be requested by the notification manager or the subscription manager, or both. Another component, such as the subscriber server, may send this notification to the subscription or the notification component when the mobile device has registered with the network.

At step 1230, a first set of applications to which the mobile device is currently subscribed is identified. In one embodiment, these applications are identified by searching a database containing mobile devices and identifications of applications to which the mobile device is currently subscribed. This database may be updated in real-time, or near real-time. Subscribe messages are communicated to the applications that comprise the first set of applications to subscribe the mobile device to the applications. A first set of notifications that is to be communicated to the mobile device is identified at step 1240. Each notification in the first set of notifications is associated with an application from the first set of applications. As such, a notification may not be communicated to the mobile device if it is associated with an application to which the mobile device is not currently subscribed. If notifications are received but the mobile device is not currently subscribed to that application, those notifications may be queued and held until the mobile device is subscribed to that application. At step 1250, a first notification message is communicated to the mobile device. This notification message includes the first set of notifications. In one embodiment, the first notification message is communicated to the mobile device by way of a call-control component that manages registration of the mobile device with the communications network.

In one embodiment, a second set of notifications is identified. Each of these notifications in the second set is associated with an application in a second set of applications, wherein each application in the second set of applications is subscribed to by the mobile device. A second notification message may then be communicated to the mobile device, which includes the second set of notifications. Notifications may be sent to the mobile device according to one or more of several factors. For instance, in one embodiment, notifications sent to the notification manager are held for a certain period or interval of time, such as for five minutes, for example, and every five minutes, the notifications are sent to the mobile device in the form of a single notification message. This greatly reduces the amount of traffic on the network thus increasing the network efficiency. Additionally, the user of the mobile device receiving the notifications may not want to receive a presence update each time another user moves location, but may want to know every five, ten, or fifteen minutes, for example, where that user is located. The time interval may be determined by the user, the service provider, or may be automatically determined based on other factors, including the time of the day, user settings, etc.

In another embodiment, the notifications are held at the notification manager until a certain predetermined number of notifications have been received, and once that number of notifications has been received, a notification message is sent to the mobile device that includes those notifications. In still another embodiment, how and when notifications are sent to the mobile device depends on the current amount of traffic on the network at that particular time. If network congestion is sensed, the notifications may be held until a time when less congestion is present on the network. In a further embodiment, the type of service provided by the application dictates when and how the notifications are sent to the mobile device. For instance, a user of the mobile device may want to receive voicemails immediately after they are left on the voicemail system but may not want or need to receive notifications relating to the weather each time they are issued or sent by the weather application. In one instance, the notifications that are included in a notifications message may be from a single application, or may be from more than one application. If the mobile device is not currently registered with the communications network, the notifications may be queued and held until the mobile device is registered.

FIG. 13 illustrates an exemplary flowchart of a method 1300 for managing notification messages that are communicated from various applications and that are intended for a mobile device, in accordance with an embodiment of the present invention. At step 1310, a first notification is received from a first application upon an occurrence of a first event. At step 1320, a second notification is received from a second application upon the occurrence of a second event. An event, for example, may be a voicemail, a location of a user, a weather update, an alert from a game, or the like. An indication is received at step 1330 that the mobile device is currently registered with a communications network. This indication may be received from a subscriber server and may be sent to the notification manager as a result of the notification manager or the subscription manager requesting that a registration notification be sent as soon as the mobile device is registered with the network, or as soon as the mobile device has become unregistered from the network.

At step 1340, it is determined that the mobile device is currently subscribed to the first and second applications such that the mobile device is enabled to communicate with the applications by way of the communications network. This determination may be made, for instance, by performing a lookup in a database that contains up-to-date information on which mobile devices are subscribed to which applications. Alternatively, this information could be received in the form of a provisioning feed. As mentioned, the notification manager and the subscription manager may be one component, or may be separate components. As such, the notification manager could receive information, such as the subscription status for a particular mobile device, from the subscription manager, or vice versa. At step 1350, a notification message is communicated to the mobile device. The notification information includes the first and the second notification, and may also include other types of information, including from where the message is sent, which applications sent the notifications, a time and/or date that the notifications were sent to the notification manager, etc. In embodiments, the applications from which the notifications are sent that are included in the notification message may be the same applications, and as such, the first and the second applications may be the same.

Further, the notification message may be communicated to the mobile device at a time that is determined by one of many factors. For instance, the notification message may be communicated to the mobile device at a predetermined interval of time after a previous notification message has been communicated to the mobile device. This interval of time may be determined by the service provider, the user, etc. Therefore, any notifications that are received between the sending of notification messages are queued and held until the next notification message is sent. Alternatively, notification messages may be sent to the mobile device when a predetermined number of notifications are received at the notification manager such that the user of the mobile device is not receiving a large amount of notifications separately, which results in an overcrowded and inefficient network. In yet another alternate embodiment, the time when the notification message is communicated to the mobile device is dependent upon the current usage of the communications network, such that the message would not be sent at a time when usage is at its highest, thus eliminating excess traffic from the network at that time.

Figure 14:
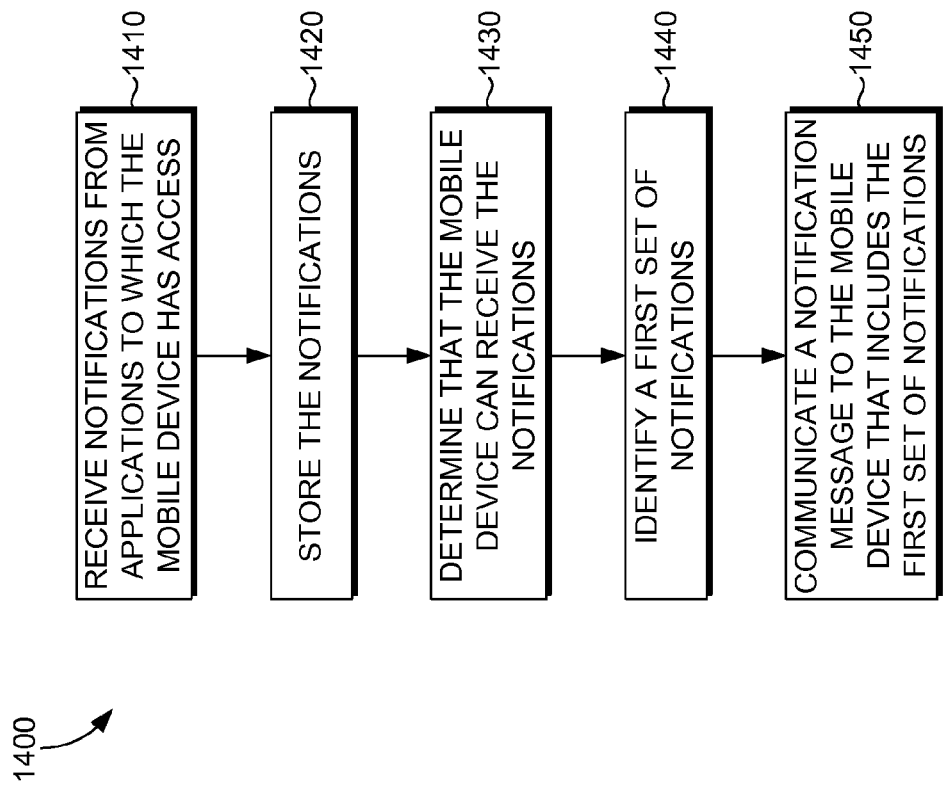

Referring now to FIG. 14, an illustrative flowchart of a method 1400 is shown for managing notification messages that are communicated from various applications and that are intended for a mobile device, in accordance with an embodiment of the present invention. At step 1410, notifications are received from one or more applications to which the mobile device has access. Each of the received notifications represents an occurrence of an event associated with the application from which the notification is sent. At step 1420, the received notifications are stored in, for instance, one or more databases. It is determined at step 1430 that the mobile device is capable of receiving at least one of the notifications. The mobile device can receive a notification if an indication has been received that the mobile device is currently registered with a communications network and if it is determined that the mobile device is currently subscribed to the application from which the notification is sent. It may be determined that the mobile device is subscribed to a first set of applications. A first set of notifications is identified at step 1440. Each of these notifications is associated with an application in the first set of applications. As previously stated, it has been determined that the mobile device is subscribed to the applications in the first set of applications. At step 1450, a notification message is communicated to the mobile device, and includes the first set of notifications. The notification message is communicated at a predetermined time interval since a communication of a previous notification message to the mobile device. This time interval may be determined by the user of the mobile device, the service provider, or may be automatically determined.

In one embodiment, the mobile device and/or one or more of the applications are associated (e.g., owned, located, operated, leased) with a foreign network, or a network different than that associated with the notification manager. In this case, information, such as a registration notification, subscribe messages, notifications, notification messages, etc., may be sent across a security boundary or border. To ward off unwanted information, the border may include one or more firewalls, one or more SBCs, or the like. Further, information may be transferred via an NNI.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, cause a notification manager to perform a method of managing notifications that are communicated from various applications accessible by a mobile device, the method comprising:

receiving a plurality of notifications from one or more applications accessible by the mobile device, wherein each of the plurality of notifications indicates an occurrence of an event associated with at least one of the one or more applications from which the notification was sent;

determining that the mobile device is currently registered with a communications network;

identifying a first set of applications from the one or more applications to which the mobile device is currently subscribed;

identifying a first set of notifications from the plurality of notifications that is to be communicated to the mobile device, wherein each notification in the first set of notifications is associated with an application in the first set of applications;

communicating to the mobile device a first notification message that includes the first set of notifications, wherein the first notification message is communicated to the mobile device by way of a call-control component that manages registration of the mobile device with the communications network;

identifying a second set of notifications from the plurality of notifications, wherein each notification in the second set of notifications is associated with an application in a second set of applications to which the mobile device is currently subscribed; and communicating to the mobile device a second notification message that includes the second set of notifications, wherein the second notification message is communicated to the mobile device at a predetermined time interval after the first set of notifications is communicated to the mobile device.

2. The computer-readable media of claim 1, wherein a registration notification is received, and indicates that the mobile device has become registered with the communications network.

3. The computer-readable media of claim 1, wherein one or more subscribe messages are communicated to each member of the first set of applications to subscribe the mobile device to the each member of the first set of applications.

4. The computer-readable media of claim 1, wherein the communications network is an Internet Protocol (IP) multimedia subsystem (IMS) network.

5. The computer-readable media of claim 1, wherein at least one of the one or more applications is associated with a foreign network.

6. The computer-readable media of claim 1, wherein the mobile device is associated with a foreign network.

7. The computer-readable media of claim 1, wherein the plurality of notifications are continuously received at the notification manager.

8. The computer-readable media of claim 1, further comprising storing the plurality of notifications until it is determined that the mobile device is registered with the communications network.

9. Non-transitory computer-readable media having computer-executable instructions embodied thereon that, when executed, cause a notification manager to perform a method of managing notifications that are communicated from various applications accessible by a mobile device, the method comprising:

upon an occurrence of a first event, receiving a first notification from a first application;

upon the occurrence of a second event, receiving a second notification from a second application;

receiving an indication that the mobile device is currently registered with a communications network;

determining that the mobile device is currently subscribed to the first and to the second applications, such that the mobile device is enabled to communicate with the first and the second applications by way of the communications network;

communicating a first notification message to the mobile device, wherein the first notification message includes the first notification and the second notification, wherein the first notification message is communicated to the mobile device by way of a call-control component that manages registration of the mobile device with the communications network; and communicating a second notification message to the mobile device that includes one or more additional notifications associated with one or more additional applications to which the mobile device is currently subscribed, wherein the second notification message is communicated to the mobile device at a predetermined time interval after the first notification message is communicated to the mobile device.

10. The computer-readable media of claim 9, wherein the first application and the second application are a same application.

11. The computer-readable media of claim 9, wherein the notification message is communicated to the mobile device at a predetermined interval of time after a previous notification message is communicated to the mobile device.

12. The computer-readable media of claim 9, wherein the notification message is communicated to the mobile device when a predetermined number of notifications are received at the notification manager.

13. The computer-readable media of claim 9, wherein a time of communicating the notification message to the mobile device is dependent upon current usage of the communications network.

14. Non-transitory computer-readable media having computer-executable instructions embodied thereon that, when executed, cause a notification manager to perform a method of managing notifications that are communicated from various applications accessible by a mobile device, the method comprising:

receiving a plurality of notifications from one or more applications to which the mobile device has access, wherein each of the plurality of notifications represents an occurrence of an event associated with one of the one or more applications;

storing the plurality of notifications;

determining that the mobile device is capable of receiving at least one of the plurality of notifications, wherein the determining includes, (1) receiving an indication that the mobile device is currently registered with a communications network, and (2) determining that the mobile device is subscribed to a first set of applications from the one or more applications;

identifying a first set of notifications from the plurality of notifications, wherein each notification in the first set of notifications is associated with an application in the first set of applications;

communicating to the mobile device a first notification message that includes the first set of notifications, wherein the first notification message is communicated at a predetermined time interval since a communication of a previous notification message to the mobile device, wherein the first notification message is communicated to the mobile device by way of a call-control component that manages registration of the mobile device with the communications network;

identifying a second set of notifications from the plurality of notifications, wherein each notification in the second set of notifications is associated with an application in a second set of applications to which the mobile device is currently subscribed; and communicating to the mobile device a second notification message that includes the second set of notifications.

15. The computer-readable media of claim 14, wherein one or more of the mobile device or at least one of the one or more applications are located in a foreign network.

16. The computer-readable media of claim 14, wherein a subscription manager communicates to the notification manager the indication that the mobile device is currently registered with the communications network.

* * * * *